United States Patent
Chung et al.

(10) Patent No.: US 9,844,755 B2
(45) Date of Patent: Dec. 19, 2017

(54) MEMBRANE FILTER CLEANING APPARATUS FOR WASTE-WATER TREATMENT PROCESS

(71) Applicant: YONGJIN ENVIRONMENT CO., LTD., Chungcheongbuk-do (KR)

(72) Inventors: Ki Hwan Chung, Chungcheongbuk-do (KR); Sun Chul Seo, Seoul (KR)

(73) Assignee: YONGJIN ENVIRONMENT CO., LTD., Yeongdong-eup, Chungcheongbuk-do (KR)

( * ) Notice: Subject to any disclaimer, the term of this patent is extended or adjusted under 35 U.S.C. 154(b) by 302 days.

(21) Appl. No.: 14/549,092

(22) Filed: Nov. 20, 2014

(65) Prior Publication Data

US 2015/0202573 A1 Jul. 23, 2015

(30) Foreign Application Priority Data

Jan. 21, 2014 (KR) .................. 10-2014-0007155

(51) Int. Cl.
| | |
|---|---|
| *B01D 65/02* | (2006.01) |
| *B08B 3/02* | (2006.01) |
| *B08B 3/10* | (2006.01) |
| *B01D 61/18* | (2006.01) |
| *B01D 63/04* | (2006.01) |
| *B01D 71/26* | (2006.01) |
| *C02F 3/12* | (2006.01) |
| *C02F 3/30* | (2006.01) |

(52) U.S. Cl.
CPC ............. *B01D 65/02* (2013.01); *B01D 61/18* (2013.01); *B01D 63/046* (2013.01); *B01D 65/025* (2013.01); *B08B 3/02* (2013.01); *B08B 3/10* (2013.01); *C02F 3/1273* (2013.01); *C02F 3/308* (2013.01); *B01D 71/26* (2013.01); *B01D 2321/16* (2013.01); *B01D 2321/40* (2013.01); *C02F 3/30* (2013.01); *Y02W 10/15* (2015.05)

(58) Field of Classification Search
None
See application file for complete search history.

(56) References Cited

U.S. PATENT DOCUMENTS

| | | | | |
|---|---|---|---|---|
| 6,723,246 B2 * | 4/2004 | Krulik | ................... | B01D 37/03 |
| | | | | 134/22.19 |
| 6,890,443 B2 * | 5/2005 | Adams | ................ | B01D 33/073 |
| | | | | 210/107 |

* cited by examiner

*Primary Examiner* — Michael Barr
*Assistant Examiner* — Rita Adhlakha
(74) *Attorney, Agent, or Firm* — Paratus Law Group, PLLC (57) ABSTRACT

Disclosed is a separation membrane cartridge-cleaning apparatus for sewage treatment process. The apparatus conveniently cleans the separation membrane cartridges, thereby improving workability, as the separation membrane cartridges mounted within the membrane separation aerobic tank of the sewage treatment process are removed which have been contaminated while performing the solid-liquid separation of the contaminants contained in the sewage, and then the cartridges are separably mounted on the cartridge-cleaning apparatus of water mill type rotatably installed within the cleaning tank containing the cleaning liquid, and thereafter, the contaminated separation membrane cartridges are immersed in the cleaning liquid and the water and air are sprayed from filter-cleaning means above the cartridges to clean the cartridges.

6 Claims, 8 Drawing Sheets

MEMBRANE FILTER CLEANING APPARATUS FOR WASTE-WATER TREATMENT PROCESS

CROSS REFERENCE TO RELATED APPLICATIONS

This application claims priority based on Korean Patent Application No. 10-2014-0007155, filed Jan. 21, 2014, the contents of which is incorporated herein by reference in its entirety.

TECHNICAL FIELD

The present invention relates to a separation membrane cartridge installed within a membrane separation aerobic tank of a sewage treatment process for a solid-liquid separation of contaminants contained in the sewage, and more particularly, it is configure such that contaminated cartridges are mounted on a cartridge-cleaning apparatus rotatably installed within a cleaning tank containing cleaning liquid and the contaminated separation membrane cartridges are immersed in the cleaning liquid and water and air are sprayed from above to clean the cartridges.

BACKGROUND ART

In general, the amount of use of water increase as society develops, and every country has an interest in improving the efficiency of removal of nitrogen and phosphorous in treating of various waste waters including urban sewage. This is because nutritive salts accelerate eutrophication and thus lower usefulness of valuable water resources and damage the ecosystem. It is a real circumstance that the problem of eutrophication spreads to almost all natural water systems and frequently occurs everywhere. In a trend that management of water quality is recently tightened, it is of course that allowed emission concentration for contaminants of emission source has to meet allowed emission criteria or criteria for the quality of discharged water, and total emission of contaminants for each water system is managed according to regulation of total emission and thus allowed concentration for contaminants of emitted water is forecasted to be further tightened for water system with a high contamination load.

An active sludge process widely used as method of secondarily treating the sewage is effective in removing of organic matter and floating matter. However, in a case where it is necessary to remove the nutritive salts, the efficiency of removal of the nitrogen and phosphorous is not particularly high, and therefore an improvement is needed. Biological advanced wastewater treatment for removing the nutritive salts such as the nitrogen and phosphorous etc. basically consists of oxygen-free step, anaerobic step, aerobic step and precipitation step, and treatment process is determined by properly combining these steps depending on the contamination load or the characteristic of contamination source. The advanced wastewater treatment method is practically used as various methods such as SBR, A2/O, MLE etc. depending on modes of installing and running of treatment facilities.

Figure 1:
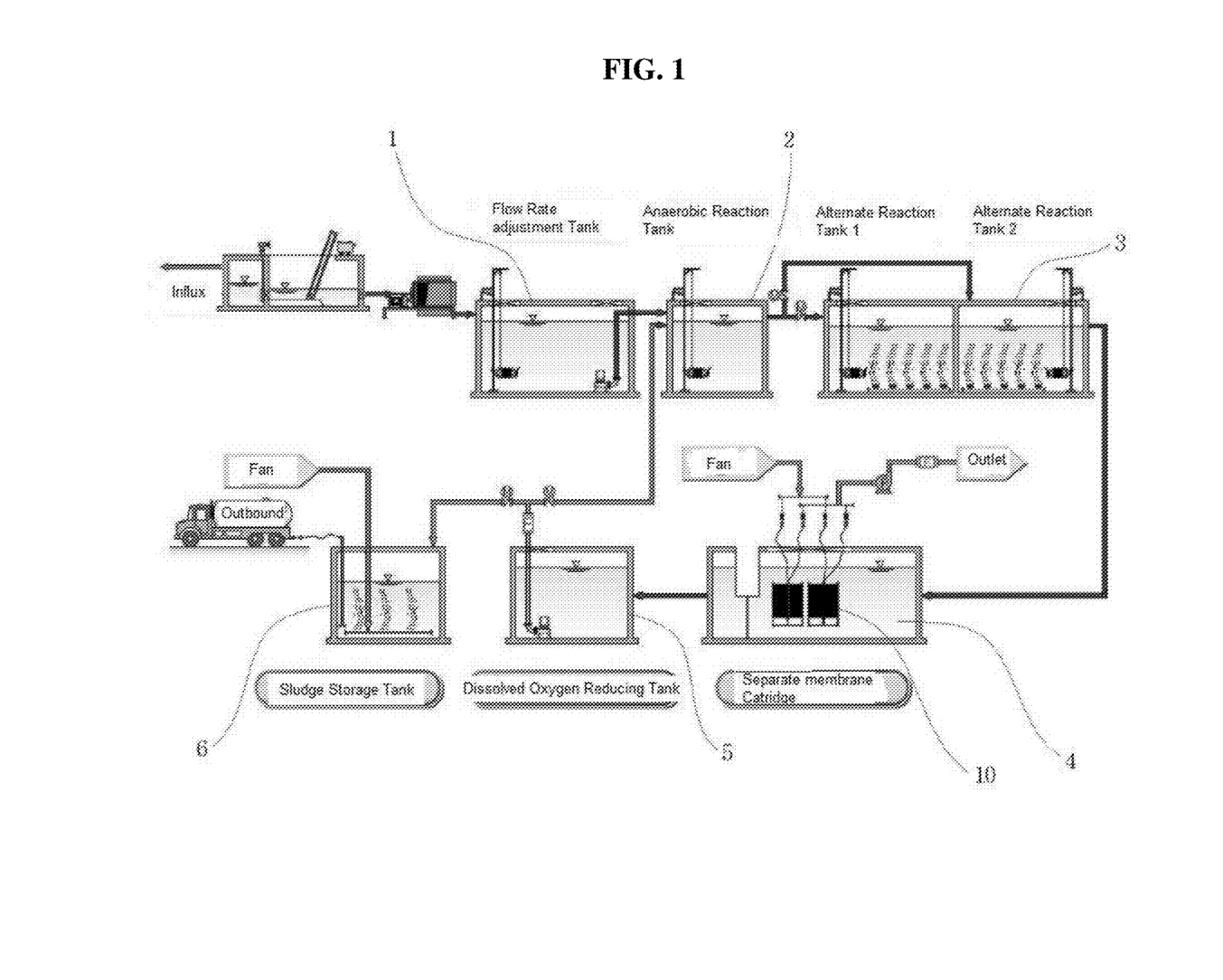
FIG. 1 is a configuration view schematically illustrating a general MBR sewage treatment process.

In recent, KSMBR (Kwater Kms Ssangyong Membrane Bio Reactor) is provided for treating the sewage. As illustrated in FIG. 1, this sewage treatment method is a process in which the sewage generated at home etc. is introduced into a flow rate adjustment tank and then into an anaerobic tank, in which the phosphorous is emitted by using the organic matter, and thereafter, the sewage is fed into alternate reaction tanks which are arranged in parallel and run in the modes of nonaeration-aeration-nonaeration and nonaeration, in which the nitrogen is treated, and then is fed into a membrane separation aerobic tank, in which the contaminants are separated into solid and liquid by separation membranes and thus the floating matter and colonbacillus are removed, and then the sewage is introduced into a dissolved oxygen-decreasing tank, in which the nitrogen (N) and phosphorous (P) are removed, and then is fed back to the anaerobic tank to be treated, and generated sludge is fed to a sludge storage tank and separately treated. Such a process is advanced sewage treatment technique which treats the organic matter, nitrogen and phosphorous and performs solid-liquid separation by means of a filtering membrane.

However, in the sewage treatment process of such a method, in order to remove the contaminants adhering to hollow fiber membranes of separation membrane cartridges installed in the membrane separation aerobic tank for solid-liquid separating of the contaminants, the separation membrane cartridges are removed and then are cleaned one by one directly by a worker at workplace using a fire-extinguishing hose, to thereby remove the contaminants, which is inconvenient.

SUMMARY OF THE INVENTION

Technical Problem

The present invention was made to solve the above-mentioned problems of prior art, and its object is to provide a separation membrane cartridge-cleaning apparatus for sewage treatment process configured such that a plurality of contaminated separation membrane cartridges are mounted on a cartridge-cleaning apparatus rotatably installed within a cleaning tank containing cleaning liquid and the contaminated membrane cartridges are immersed in the cleaning liquid and water and air are sprayed from above to clean the cartridges.

Solution to the Problem

Solution to the problem of the present invention lies in that in a sewage treatment process comprising a flow rate adjustment tank into which the sewage is introduced; an anaerobic tank for emitting phosphorous by using organic matter which can be decomposed due to introduction of inflow water and of return sludge; alternate reaction tanks which are arranged in parallel and run in modes of nonaeration-aeration-nonaeration and nonaeration to remove nitrogen; a membrane separation aerobic tank which removes floating matter and colonbacillus by immersing a precise filtering membrane made of polyolefin-based hollow fibers; and a dissolved oxygen-decreasing tank for improving an efficiency of removal of nitrogen and phosphorous, a separation membrane cartridge-cleaning apparatus is provided which is installed within the membrane separation aerobic tank for cleaning separation membrane cartridges contaminated by contaminants contained in the sewage, the separation membrane cartridge-cleaning apparatus comprises: a cleaning tank containing cleaning liquid therein and having a cover which is provided on an upper part of the cleaning tank; a rotating body of polygonal shape which is rotatably installed in an upper area of the cleaning tank and on which the separation membrane cartridges are separably fastened by fastening means so that the cartridges are immersed in the cleaning liquid; cartridge-cleaning means installed under the cover for removing the contaminants adhering to hollow fiber membranes within the separation membrane cartridges; and a control device provided outside the cleaning tank for controlling operations of the rotating body and the cleaning means.

Effects of the Invention

The present invention provides an effect that cleaning work for the separation membrane cartridges is convenient, thereby improving workability, as the separation membrane cartridges mounted within the membrane separation aerobic tank of the sewage treatment process are removed which have been contaminated while performing the solid-liquid separation of the contaminants contained in the sewage, and then the cartridges are separably mounted on the cartridge-cleaning apparatus of water mill type rotatably installed within the cleaning tank containing the cleaning liquid, and thereafter, the contaminated separation membrane cartridges are immersed in the cleaning liquid and the water and air are sprayed from filter-cleaning means above the cartridges to clean the cartridges.

BEST MODES FOR CARRYING OUT THE INVENTION

Hereinafter, an embodiment of the present invention will be described in detail with reference to the attached drawings.

First, referring to FIG. 1, MBR sewage treatment process will be schematically described. The sewage treatment process includes a flow rate adjustment tank (1) into which the sewage is introduced; an anaerobic tank (2) for emitting phosphorous by using organic matter which can be easily decomposed due to introduction of inflow water and of return sludge; alternate reaction tanks (3) which are arranged in parallel and are run in modes of nonaeration (N1)-aeration (A)-nonaeration (N2) and nonaeration to remove nitrogen (N); a membrane separation aerobic tank (4) which removes floating matter and colonbacillus by immersing a precise filtering membrane made of polyolefin-based hollow fiber; and a dissolved oxygen-decreasing tank (5) for improving an efficiency of removal of nitrogen (N) and phosphorous (P). Generated sludge is fed to a sludge storage tank (6) and separately treated.

At this time, separation membrane cartridges (10) are installed within the membrane separation aerobic tank (4) to perform solid-liquid separation for contaminants contained in the sewage.

Each of the separation membrane cartridges (10) includes a cartridge body (12) of rectangular shape having outlet ports (12a) through which the introduced inflow water (sewage) that has been treated is discharged; and hollow fiber membranes (14) which are installed within the cartridge body (12) and separate the contaminants.

Meanwhile, as illustrated in FIGS. 2 to 5, a separation membrane cartridge-cleaning apparatus (20) is provided for washing out contaminants adhering to the hollow fiber membranes (14) of the separation membrane cartridge (10). The separation membrane cartridge-cleaning apparatus (20) includes a cleaning tank (34) containing cleaning liquid therein and having a cover (31) which is provided on an upper part of the cleaning tank and can be opened and closed by means of a hinge member (32); a rotating body (40) which is rotatably installed in an upper area of the cleaning tank (34) and on which the separation membrane cartridges (10) are separably fastened by fastening means (50) so that the cartridges are immersed in the cleaning liquid; and cartridge-cleaning means (80) installed on the cover (31) for removing the contaminants adhering to the hollow fiber membranes (14) within the separation membrane cartridges (10).

Figure 2:
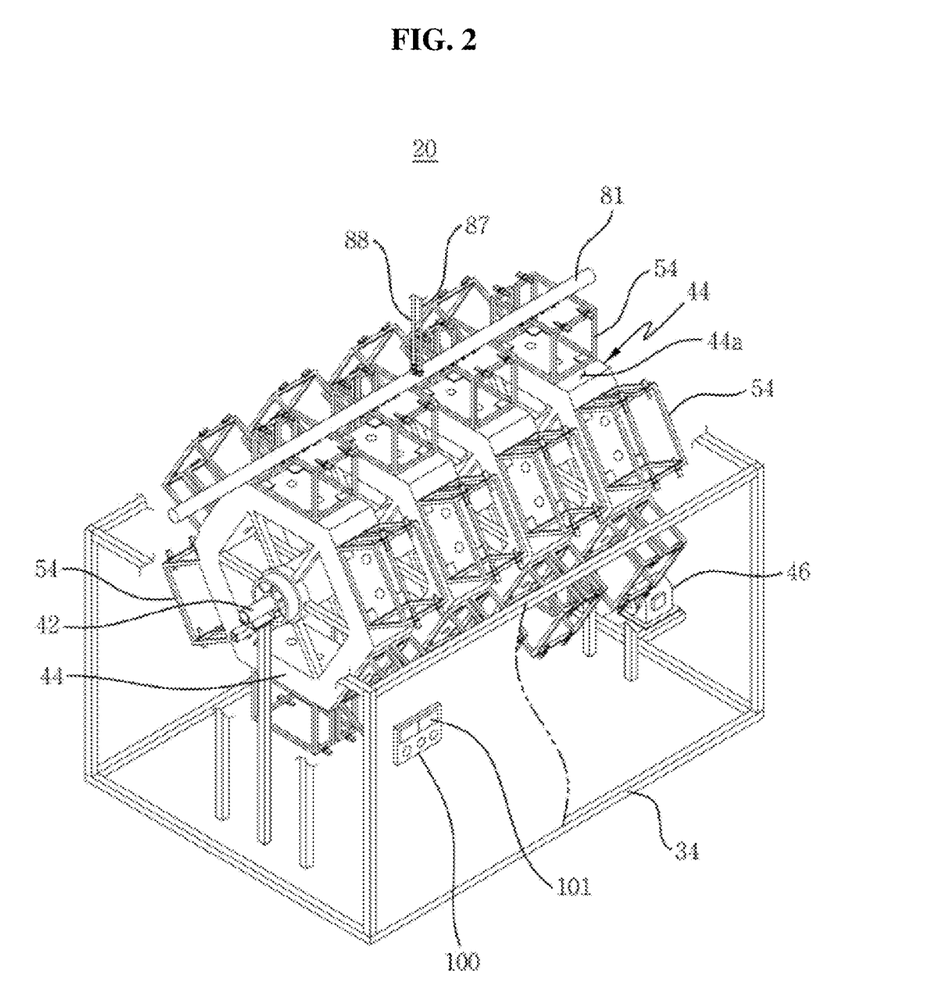
FIG. 2 is a perspective view illustrating a separation membrane cartridge-cleaning apparatus for sewage treatment process according to the present invention.
Figure 3:
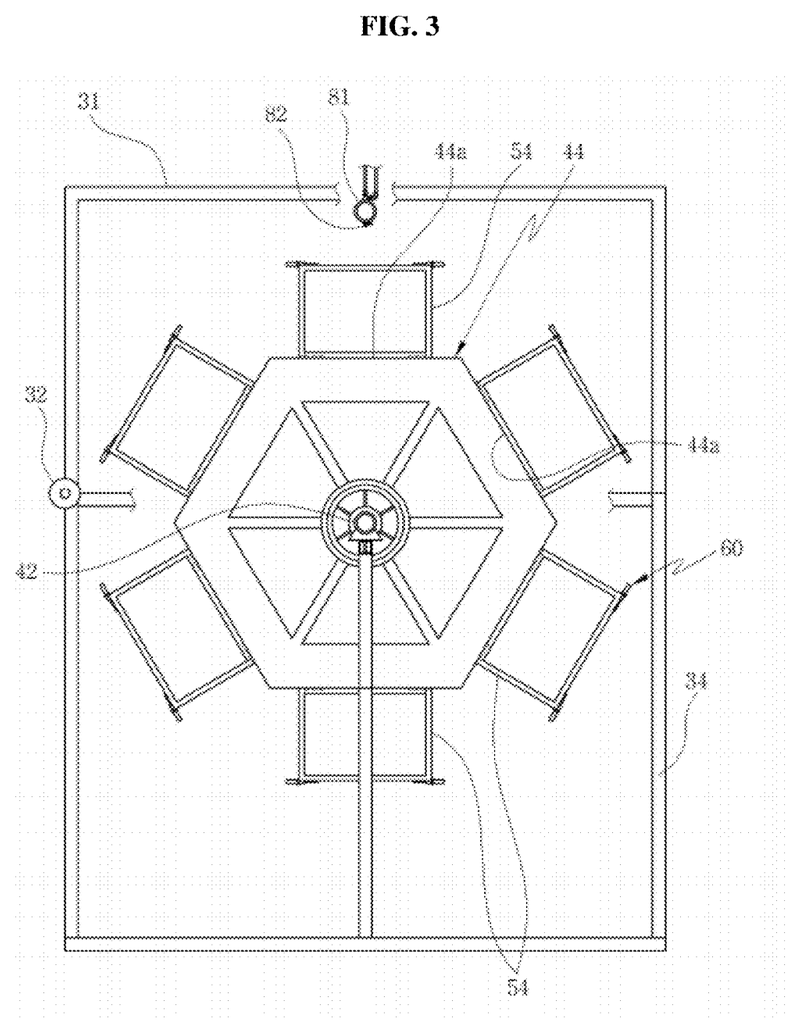
FIG. 3 is a side configuration view illustrating the separation membrane cartridge-cleaning apparatus for sewage treatment process according to the present invention.
Figure 4:
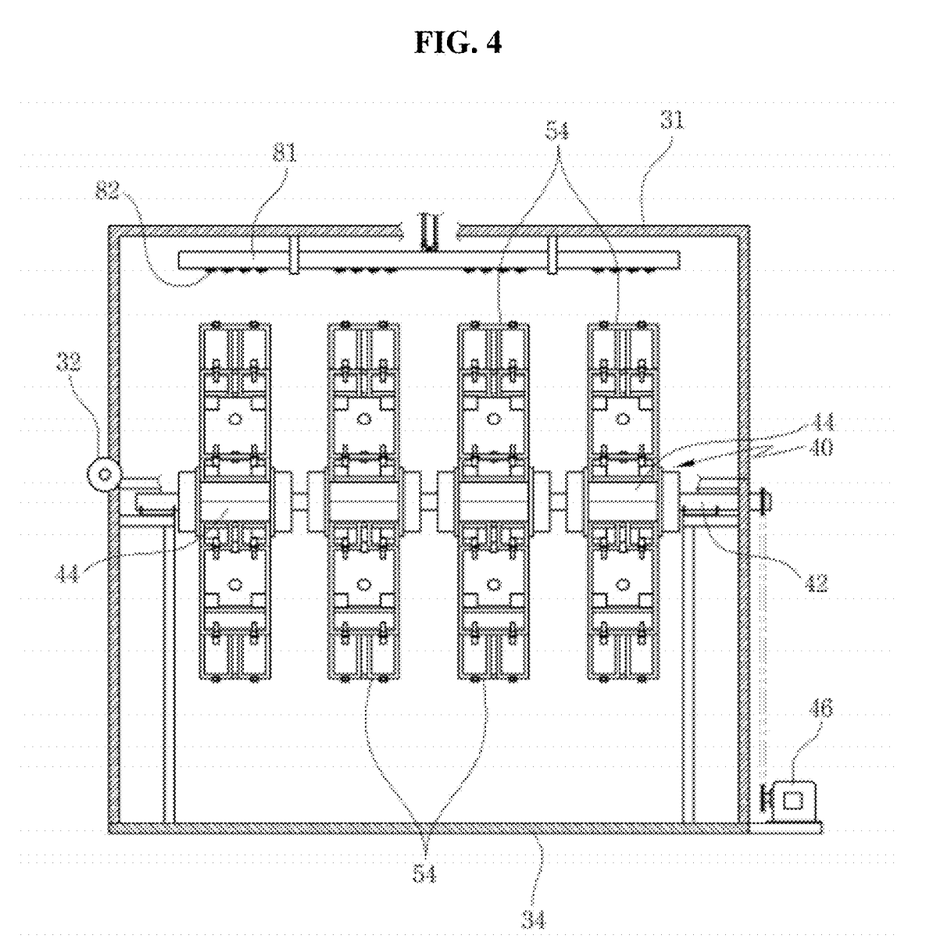
FIG. 4 is a front configuration view illustrating the separation membrane cartridge-cleaning apparatus for sewage treatment process according to the present invention.

At this time, acid- and alkaline-based chemicals are added to the cleaning liquid contained in the cleaning tank (34) to precipitate the contaminants adhering to the hollow fiber membranes (14) of the separation membrane cartridges (10). It is preferable that the amount of the cleaning liquid is such that the separation membrane cartridges (10) are immersed in the cleaning liquid.

The rotating body (40) includes a rotational shaft (42) rotatably installed in the upper area of the cleaning tank (34); and a plurality of rotational carts (44) which are fixed to an outer circumferential surface of the rotational shaft (42) while being spaced apart from each other and on which the separation membrane cartridges (10) are separably fastened by the fastening means (50).

At this time, the rotational shaft (42) is connected with a low-speed motor (46) slowly rotating forward and rearward, so that the shaft also slowly can be rotated forward and rearward. The rotational carts (44) are of polygonal shape and the separation membrane cartridges (10) are separably mounted on angular surfaces (44a) of the rotational carts, respectively.

Figure 5:
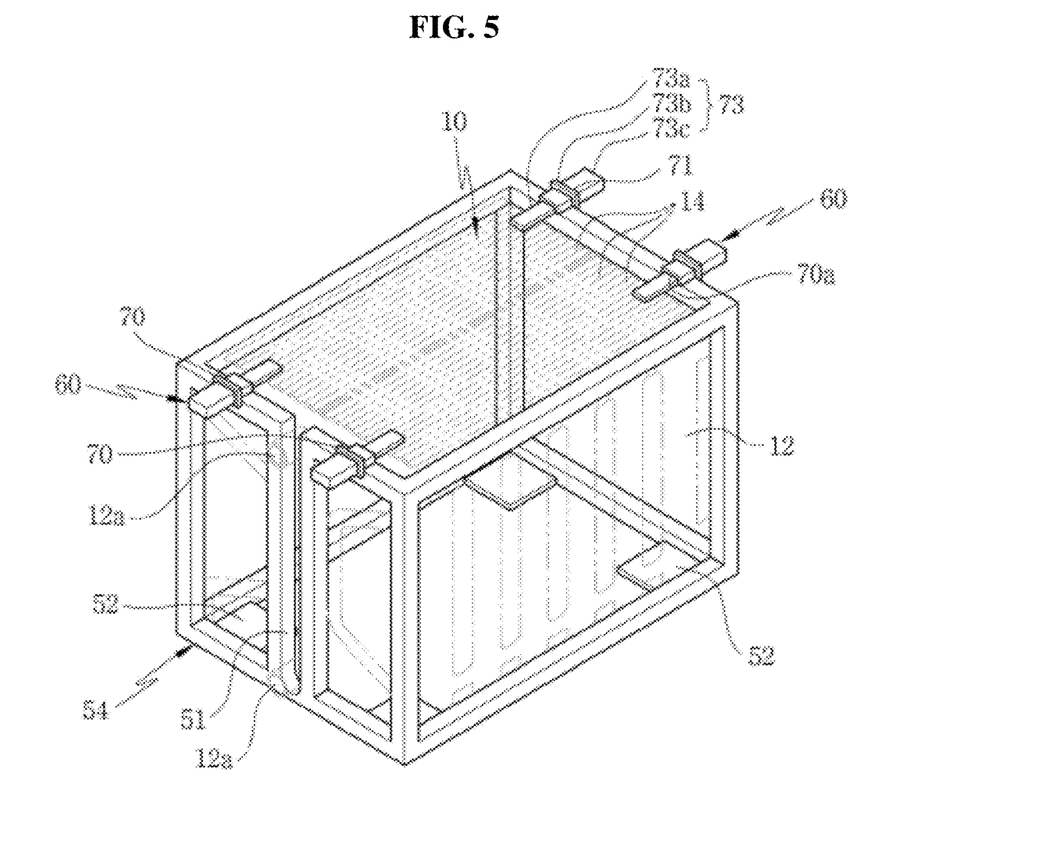
FIG. 5 is a perspective view illustrating a state where the separation membrane cartridge is fastened by a cartridge-fastening member constituting the separation membrane cartridge-cleaning apparatus for sewage treatment process according to the present invention.

The fastening means (50) includes an installation frame (54) which is assembled in the form of a rectangular parallelepiped open on front, rear, right, left, upper and lower sides and is installed on the angular surface (44a) of the rotational cart (44) and in which the cartridge body (12) is inserted and which has supporting members (52) provided at corners of a lower end of the installation frame, on which supporting members a lower end of the cartridge body (12) stably rests; and cartridge-fastening members (60) provided on an upper part of the installation frame (54) on right and left sides for stably fixing the cartridge body (12).

At this time, a vertical guide hole (51) is vertically formed on a left or right side of the installation frame (54). Outlet ports (12a) provided on the cartridge body (12) are stably coupled with the vertical guide hole when the cartridge body (12) is inserted in the installation frame.

The cartridge-fastening members (60) includes locking devices (70)(71) which are fixed to left and right sides of upper end of the installation frame (54) while corresponding to each other and have a locking opening (70a); and lockers (73) which are extendably and retractably inserted through the locking opening (70a) of the locking devices (70)(71) and a lower end of which closely contacts with an upper end of the cartridge body (12) to thereby stably fix the cartridge body (12).

Figure 6:
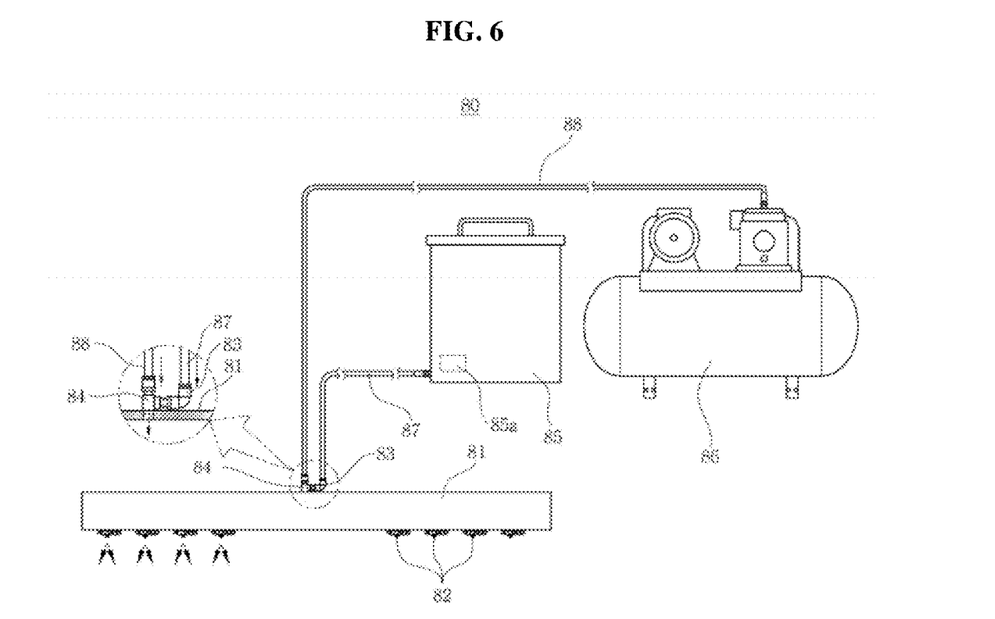
FIG. 6 is a configuration view of cleaning means illustrating the separation membrane cartridge-cleaning apparatus for sewage treatment process according to the present invention.

At this time, each of the lockers (73) includes a close contact portion (73a) which is extendably and retractably inserted in the locking opening (70a) to closely contact with the upper end of the cartridge body (12); a blocking portion (73b) which is formed at a rear end of the close contact portion (73a) in a stepped manner and thus stops movement of the close contact portion (73a) forward of the locking opening (70); and a handle portion (73c) which is formed at a rear end of the blocking portion (73b) and extends and retracts the close contact portion (73a) forward and rearward of the locking opening (70a). Meanwhile, as illustrated in FIG. 6, the cartridge-cleaning means (80) includes a spraying part (81) which is mounted under the cover (31) in such a manner that the spraying part is close to the hollow fiber membrane (14) within the separation membrane cartridge (10); a plurality of spraying nozzles (82) which are separably inserted in and fixed to an outer circumferential surface of the spraying part (81) while exposed; a water connection port (83) and an air connection port (84) which are separably fastened to the spraying part (81) in such a way as to be in communication therewith; and a water feed pipe (87) and an air feed pipe (88) which are connected between the water connection port (83) and an underwater pump (85a) of the water storage tank (85) and between the air connection port (84) and an air compressor (86), respectively to feed the water and air into the spraying part (81).

At this time, outside the cleaning tank (34), a control device (100) is provided for controlling operations of the low-speed motor (46) rotating forward and rearward, the pump (85a) and the air compressor (86). The control device (100) is provided with a timer (101) which enable the motor, the pump and the compressor to operate for a set period of time.

Schematic description will be made of a process of treating the sewage in the sewage treatment process configured as above according to the present invention.

As illustrated in FIG. 1, the sewage generated at each home etc. is introduced into the flow rate adjustment tank (1) and then into the anaerobic tank (2), in which the phosphorous is emitted by using the organic matter. Thereafter, the sewage is fed into the alternate reaction tanks (3) which are arranged in parallel and run in the modes of nonaeration-aeration-nonaeration and nonaeration, in which the nitrogen is treated, and then is fed into the membrane separation aerobic tank (4), in which the contaminants contained in the sewage are filtered and immersed and thus the floating matter and colonbacillus are removed while the sewage is passing through the hollow fiber membranes (14) of the separation membrane cartridge (10) mounted in the membrane separation aerobic tank. Next, the sewage is introduced into the dissolved oxygen-decreasing tank (5), in which the nitrogen (N) and phosphorous (P) are removed, and then is fed back to the anaerobic tank (2) to be treated.

Meanwhile, after the separation membrane cartridges (10) installed in the membrane separation aerobic tank (4) has been used for an appropriate period of time in treating of the sewage in the sewage treatment process, filtering capability of the cartridges is lowered since the contaminants adhere between the hollow fiber membranes (14); therefore, the separation membrane cartridges are removed and separately cleaned. The separation membrane cartridge (10) thus separately removed are mounted on the cartridge-cleaning apparatus (20) and then cleaned.

Operational states of it will be described. As illustrated in FIGS. 2 to 5, the cover (41) on the upper part of the cleaning tank (44) is opened by means of the hinge member (42), and thereafter, the cartridge body (12) of the separation membrane cartridge (10) is rested within the installation frame (54) provided on the angular surface (44a) of the rotational cart (44) constituting the rotational body (40).

Namely, as illustrated in FIG. 5, when the cartridge body (12) of the separation membrane cartridge (10) is inserted in the installation frame (54) assembled in the form of rectangular parallelepiped open on front, rear, right, left, upper and lower sides, the outlet ports (12a) of the cartridge case (12) are inserted along the vertical guide hole (51) of the installation frame (54) and at the same time the lower end of the cartridge case (12) is rested on the supporting members (52) provided at the corners of the lower end of the installation frame (54).

Figure 8:
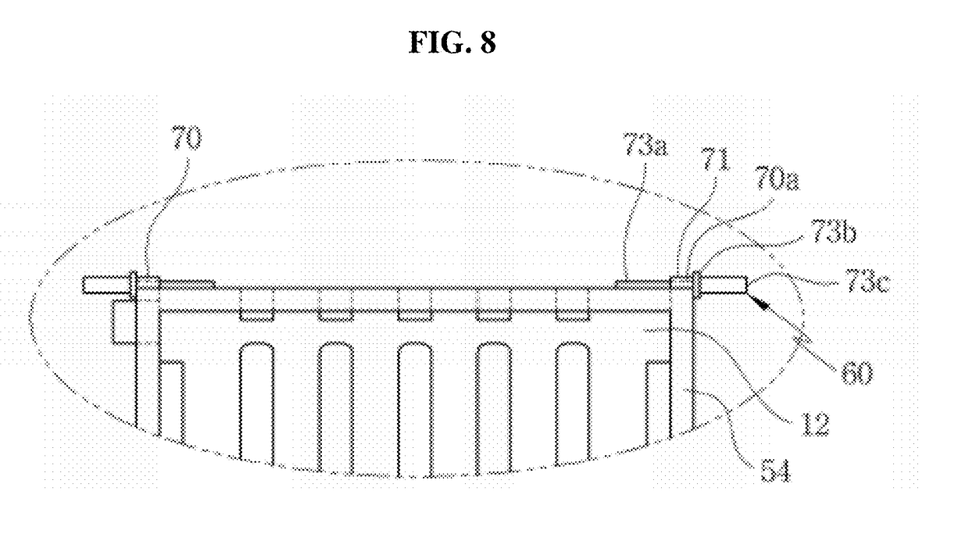
FIG. 8 is an enlarged configuration view of a part "A" of FIG. 7.

In such a state, as illustrated in FIG. 8, when the lockers (73) are sequentially moved by gripping the handle portion (73c) of the lockers (73), the close contact portion (73a) is extended forward along the locking opening (70a) of the locking devices (70)(71) fixed to the left and right sides of the upper end of the installation frame (54) while corresponding to each other and thus the lower end of the close contact portion closely contacts with the upper end of the cartridge body (12), and the stopping portion (73b) of the locker (73) engages the rear end of the locking devices (70)(71) to thereby stop the movement of the close contact portion, whereby the cartridge body (12) is stably fastened.

In such a sequence, the cartridge cases (12) are sequentially mounted within the installation frames (54) provided on the angular surfaces (44a) of the rotational cart (44), respectively.

Next, as illustrated in FIGS. 2 and 4, the cover (31) is closed and then operation time and rotational direction etc. of the low-speed motor (46) rotating in forward and rearward, the underwater pump (85a) and the air compressor (86) are set by manipulating the timer (101) of the control device (100) provided outside the cleaning tank (34), and thereafter the motor, pump and compressor are operated.

Then, the low-speed motor (46) slowly rotates forward and thus the rotational shaft (42) rotatably installed in the upper area of the cleaning tank (34) is rotated forward. Accordingly, the plurality of rotational carts (44) is slowly rotated forward which are fixed to the outer circumferential surface of the rotational shaft (42) while being spaced apart from each other and on which the separation membrane cartridges (10) are separably fastened by the fastening means (50) and which are immersed in the cleaning liquid in the cleaning tank (34).

Figure 7:
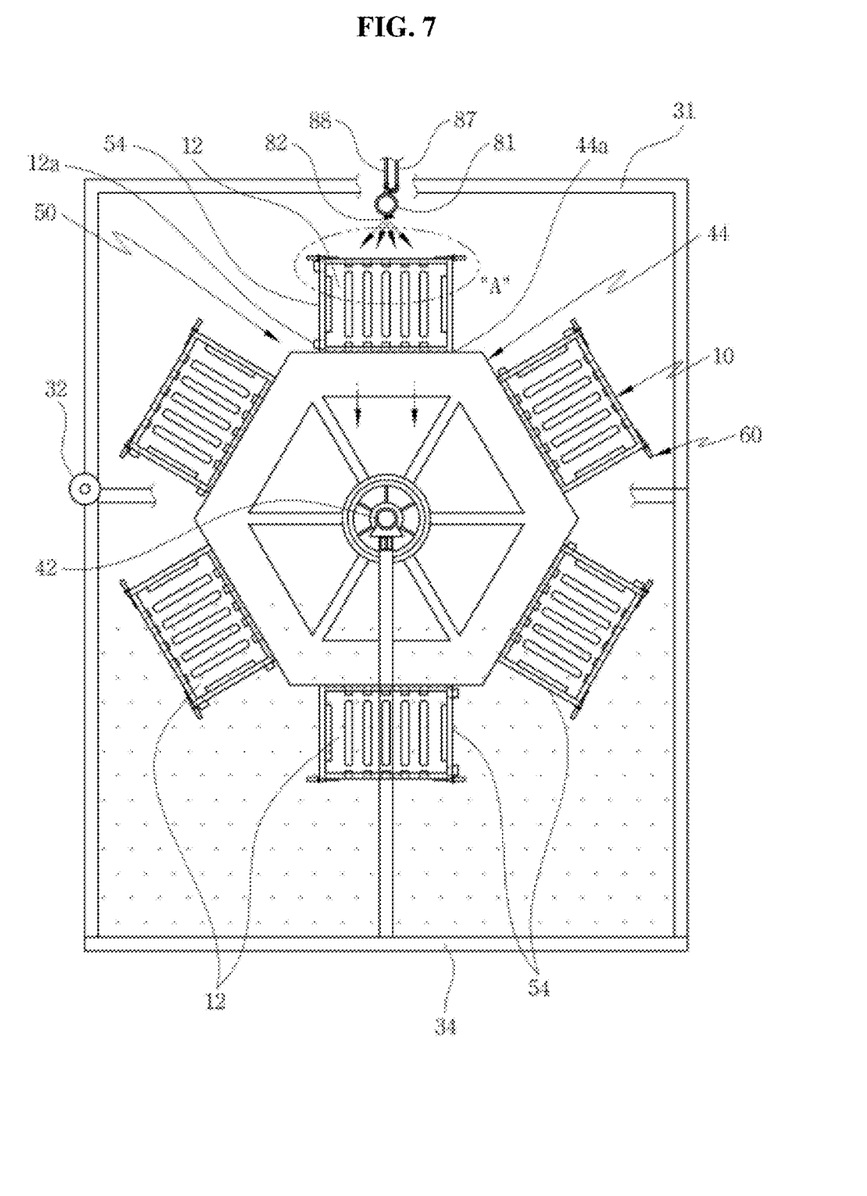
FIG. 7 is a configuration view illustrating operational states of the separation membrane cartridge-cleaning apparatus for sewage treatment process according to the present invention.

At the same time, as illustrated in FIG. 7, the underwater pump (85a) in the water storage tank (85) and the air compressor (86) operate, and thus the water of appropriate pressure passes through the water feed pipe (87) and the air feed pipe (88) which are connected between the water connection port (83) and the underwater pump (85a) and between the air connection port (84) and the air compressor (86), respectively—the water connection port and the air connection port being separably fastened to the spraying part (81) provided under the cover (31) in such a way as to be in communication with the spraying part—and then through the water connection port (83) and the air connection port (84) to flow into the spraying part (81) and then to be sprayed outward through the plurality of spraying nozzles (82) fastened to the spraying part (81). In this way, the contaminants adhering to the hollow fiber membranes (14) of the separation membrane cartridge (10) are removed and the contaminants washed out flow downward into the cleaning tank (34) (refer to FIG. 6).

After cleaning of the hollow fiber membranes (14) of the separation membrane cartridge (10) has been performed in such a sequence for a period of time set by the timer (101) of the control device (100), the cover (31) of the cleaning tank (34) is opened and then the lockers (73) are moved rearward by gripping the handle portion (73c) of the lockers (73). Accordingly, the lower end of the front close contact portion (73a) is moved rearward along the locking opening (70a) of the locking devices (70)(71) while being separated from the upper end of the cartridge body (12), whereby fastening force on the cartridge body (12) is released.

In such a state, the cleaning-completed separation membrane cartridges (10) mounted within the installation frame (54) of the rotational cart (44) are sequentially separated, and then stand by for next cleaning work.

Meanwhile, the contaminants in the cleaning tank (34) which have been generated in the cleaning are drained and separately treated.

Meanwhile, in order to effectively remove the contaminants adhering to the hollow fiber membrane (14) of the separation membrane cartridge (10), the separation membrane cartridge (10) is rotated rearward by rotating rearward the low-speed motor (46) by operating the control device (100) or the separation membrane cartridge (10) mounted within the installation frame (54) is revolved for the cleaning work by operating the low-speed motor (46) with repetition of forward and rearward rotations for a predetermined period of time.

Although preferred embodiment of the present invention is mainly described in the above description, technical concept of the present invention is not limited to it, and each element of the present invention may be changed or modified in order to achieve the same objects and effects, without departing from the technical scope of the present invention.

DESCRIPTION OF REFERENCE NUMERALS

1: flow rate adjustment tank
2: anaerobic tank
3: alternate reaction tanks
4: membrane separation aerobic tank
5: dissolved oxygen-decreasing tank
10: separation membrane cartridge
12: cartridge body
14: hollow fiber membrane
20: separation membrane cartridge-cleaning apparatus
31: cover
34: cleaning tank
40: rotating body
42: rotational shaft
44: rotational cart
46: low-speed motor
50: fastening means
51: vertical guide hole
52: supporting member
54: installation frame
60: cartridge-fastening member
70,71: locking device
70a: locking opening
73: locker
73a: close contact portion
73b: stopping portion
73c: handle portion
80: cartridge-cleaning means
81: spraying part
82: spraying nozzle
83: water connection port
84: air connection port
85: water storage tank
85a: underwater pump
86: air compressor
87: water feed pipe
88: air feed pipe
100: control device

What is claimed is:

1. A separation membrane cartridge-cleaning apparatus for sewage treatment process using a sewage treatment process system including a flow rate adjustment tank into which sewage is introduced; an anaerobic tank receiving fluid from the flow rate adjustment tank and emitting phosphorous by using organic matter which can be decomposed due to introduction of inflow water and of return sludge; alternate reaction tanks receiving fluid from the anaerobic tank and which are arranged in parallel and run in modes of nonaeration-aeration-nonaeration and nonaeration to remove nitrogen; a membrane separation aerobic tank receiving fluid from the alternate reaction tanks and which removes floating matter and colonbacillus by immersing a precise filtering membrane made of polyolefin-based hollow fibers; and a dissolved oxygen-decreasing tank receiving fluid from the membrane separation aerobic tank and for improving an efficiency of removal of nitrogen and phosphorous, wherein the separation membrane cartridge-cleaning apparatus is configured to clean separation membrane cartridges contaminated by contaminants contained in the sewage in the membrane separation aerobic tank, and wherein the separation membrane cartridge-cleaning apparatus comprises:

a cleaning tank containing cleaning liquid therein for cleaning the separation membrane cartridges and having a cover which is provided on an upper part of the cleaning tank;

a rotating body of polygonal shape which is rotatably installed in an upper area of the cleaning tank and on which the separation membrane cartridges are separably fastened by fastening means so that the cartridges are immersed in the cleaning liquid;

cartridge-cleaning means installed under the cover for removing the contaminants adhering to hollow fiber membranes within the separation membrane cartridges; and a control device provided outside the cleaning tank for controlling operations of the rotating body and the cleaning means.

2. The separation membrane cartridge-cleaning apparatus according to claim 1, wherein the rotating body comprises:

a rotational shaft rotatably installed in the upper area of the cleaning tank and rotated by a low-speed motor rotational force of which is controlled with control by the control device; and rotational carts of polygonal shape which are fixed to an outer circumferential surface of the rotational shaft while being spaced apart from each other and on which the separation membrane cartridges are separably fastened by the fastening means.

3. The separation membrane cartridge-cleaning apparatus according to claim 2, wherein the fastening means comprises:
an installation frame which is assembled in the form of rectangular parallelepiped open on front, rear, right, left, upper and lower sides and is installed on an angular surface of the rotational cart and which has supporting members provided at corners of a lower end of the installation frame, on which supporting members a lower end of the cartridge body stably rests; and
cartridge-fastening members provided on an upper part of the installation frame on right and left sides thereof for stably fixing the cartridge body.

4. The separation membrane cartridge-cleaning apparatus according to claim 3, wherein a vertical guide hole is vertically formed on a left or right side of the installation frame and outlet ports of the cartridge body are guided along the vertical guide hole when the cartridge body is mounted in the installation frame.

5. The separation membrane cartridge-cleaning apparatus according to claim 3, wherein the cartridge-fastening members comprise:
locking devices which are fixed to left and right sides of upper end of the installation frame while corresponding to each other and have a locking opening; and
lockers each comprising a close contact portion which is extendably and retractably inserted in the locking opening to closely contact with an upper end of the cartridge body; a stopping portion which is formed at a rear end of the close contact portion in a stepped manner; and a handle portion formed at a rear end of the stopping portion.

6. The separation membrane cartridge-cleaning apparatus according to claim 1, wherein the cartridge-cleaning means comprises:
a spraying part which is mounted under the cover in such a manner that the spraying part is close to the hollow fiber membranes within the separation membrane cartridge;
a plurality of spraying nozzles which are separably fastened to an outer circumferential surface of the spraying part while exposed;
a water connection port and an air connection port which are separably fastened to the spraying part in such a way as to be in communication with the spraying part; and
a water feed pipe and an air feed pipe which are connected between the water connection port and an underwater pump provided in a water storage tank and between the air connection port and an air compressor, respectively to feed the water of the underwater pump and air of the air compressor into the spraying part under control by control program of the control device.

* * * * *